Patented Nov. 1, 1949

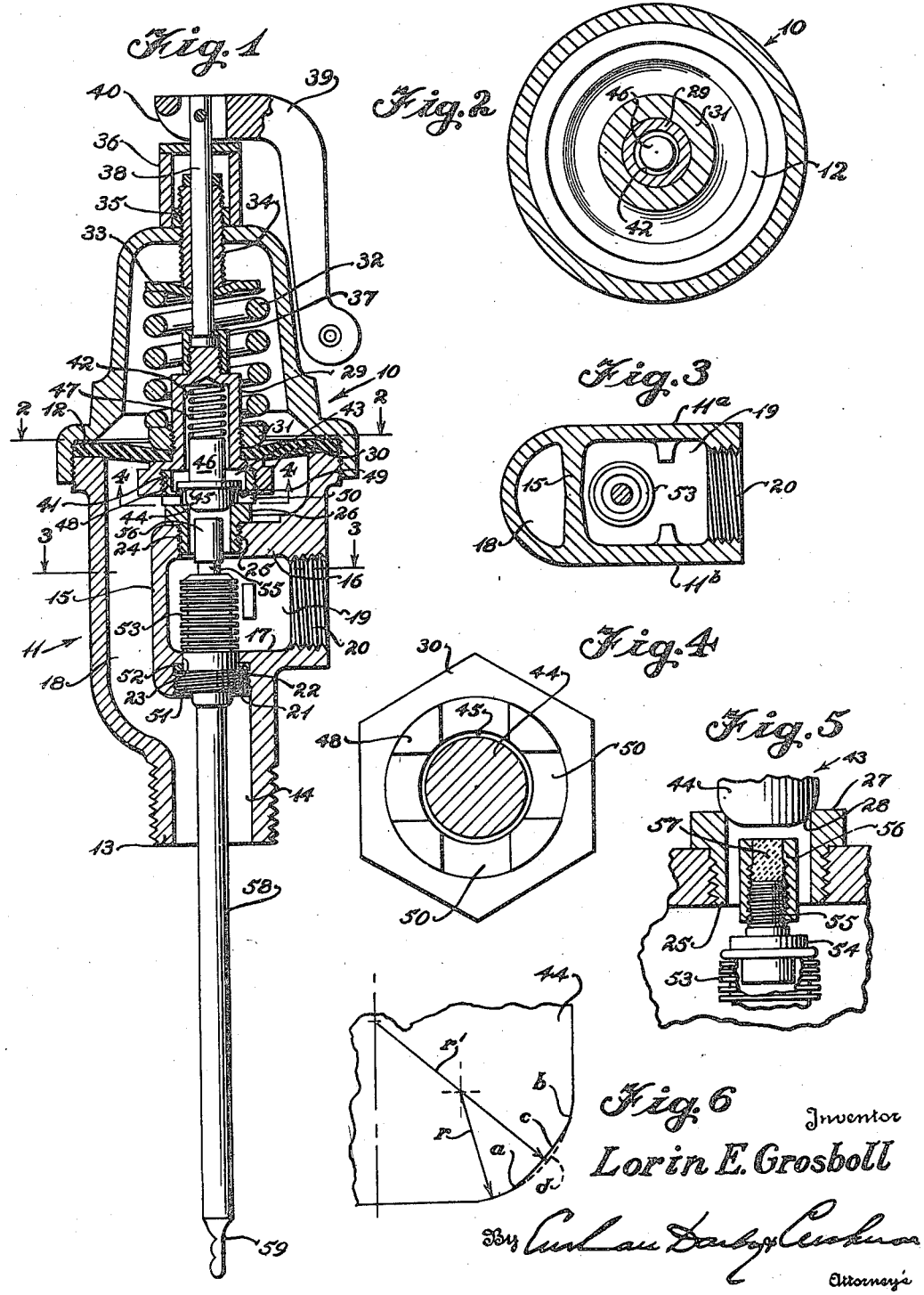

2,486,644

UNITED STATES PATENT OFFICE 2,486,644

RELIEF VALVE

Lorin E. Grosboll, Decatur, Ill., assignor to Mueller Co., Decatur, Ill., a corporation of Illinois Application September 16, 1946, Serial No. 697,263

3 Claims. (Cl. 236—92)

This invention relates to relief valves and, in one phase, in particular to a relief valve actuated upon the occurrence of excessive temperature in a confined fluid body. In this connection, an object of the invention is to provide a simple and advantageous mounting for a heat-expandible actuating element, and to provide transmission means between the said element and the movable valve element assuring the operation of the latter at a predetermined temperature. Another phase of the invention is concerned with the pressure operation of the movable valve element, the object in this connection being to provide an improved association of the valve element and a spring-loaded operating diagram thereof, together with improved means for limiting the action of the spring loading. Another object is to provide a simple and compact combined temperature and pressure responsive relief valve. A further object is to provide an improved metal-to-metal valve and seat arrangement of value not only in relief valves, but also in valves in general.

The invention is shown in illustrative embodiment in the drawing, in which:

Figure 1 is an axial section of a combined temperature and pressure responsive relief valve.

Figure 2 is a section substantially on line 2—2 of Figure 1.

Figure 3 is a section substantially on line 3—3 of Figure 1.

Figure 4 is a section substantially on line 4—4 of Figure 1.

Figure 5 is an enlarged axial section showing the valve and seat arrangement and adjusted transmission means for the movement of the heat-expansible element, and Figure 6 is a considerably enlarged view of the lower portion of the valve element which appears in Figures 1 and 5.

Reference numerals 10 and 11 designate the upper and lower parts of a casing, the parts as here shown being threaded together and clamping between them a diaphragm 12. Beneath its circular upper end, the sides 11a and 11b of portion 11 are brought into substantially parallel relation as shown in Figure 3, the walls terminating downwardly in a neck 13 threaded for the support of the valve in operative relation, neck 13 defining an inlet port 14. An internal vertical wall 15 joins the side walls 11a and 11b and horizontal top and bottom walls 16 and 17 join wall 15 and the side walls so that an inlet chamber 18 bounded in part by the diaphragm 12 is provided, an outlet chamber 19 having an outlet port 20 being also defined. Partition portion 17 is provided with a threaded bore 21 of smaller diameter than bore 14, bore 21 terminating upwardly in an annular shoulder 22 which defines a circular opening 23 which, like bore 21, is on the axis of neck 13. Partition portion 16 is provided with a threaded bore 24 coaxial with bore 21 and threaded in bore 24 is a ring 25 having a top annular flange 26 whose top surface 27 is in a plane normal to the bore axis, the sharp inner edge 28 of the ring, in the present instance, constituting a valve seat.

Diaphragm 12 has an opening aligned with the valve seat and receiving the shank 29 of a pressure plate 30, the shank having threaded thereon a pressure plate in the form of a nut 31. Seated against the nut is a compression spring 32 whose upper end engages an abutment 33 which is adjustably supported by a hollow screw 34 threaded in a central opening in the top of the upper housing section 10.

Reference numeral 35 designates a lock nut for screw 34 within a guard 36 in the form of an inverted cup which is freely rotatable relative to the nut on top of the bonnet 10 so that with the guard in place, the adjustment of screw 34 cannot be tampered with. Swiveled to the top of the shank 10 by means of the coupling member 37 is a rod 38 which projects upwardly through the guard and has pivoted to its projecting extremity a handle 39 which has a cam portion 40 cooperable with the top of the guard so that when the handle is swung counter-clockwise, the diaphragm will be lifted for test purposes.

Pressure plate 30 has a circular threaded bottom cavity 41 coaxial with the valve seat and of greater diameter, and extending from the cavity into shank 29 is a coaxial bore 42. Reference numeral 43 designates a valve member which includes a head 44, an annular flange 45, and a stem 46, the latter being loosely received in bore 42 in engagement with a relatively weak compression spring 47 in the upper part of the latter. A ring 48 is threaded in cavity 41 into abutment with the end wall of the latter and has an inwardly projecting annular flange 49 spaced from the cavity end wall and underlying flange 45, head 44 and flange 45 having lateral clearances in ring 48 substantially the same as stem 46 in bore 42. The lower surface of ring 48 is normally engaged with the outer marginal portion of surface 27 of the seat ring 25 to limit the action of spring 32 and the lower end of the ring is provided with four radial grooves 50 providing flow passages from the inlet chamber 18 across surface 27 when ring 48 is seated. With ring 48 thus engaging the seat ring and with the valve head 44 seated, flange 45 is spaced both from flange 49 and from the cavity end wall, as shown in Figure 1. This means that due to the lost motion connection the diaphragm can lift somewhat as the result of slight over-pressures without disturbing the valve member, and further, that the valve member can be lifted, without disturbing the diaphragm, to permit flow from the inlet chamber 18 through passages 50 and the seat ring to the outlet chamber 19.

Valve head 44 has a convex lower surface which is first developed by machining on the radius $r$, Figure 6, and then by lapping on the longer radius $r'$ so that there are produced two annular machined zones $a$ and $b$ on the radius $r$ and an intermediate smoothly merging annular lapped zone $c$ on the radius $r'$, the lapping operation removing the dotted line portion $d$ of the original radius. Zone $c$ is the seating zone of the valve head, cooperating with the line seat as most clearly shown in Figure 5. By lapping on the larger radius $r'$, grooving of the head such as would result from lapping on the same radius is avoided, and the flow past the convex surfaces is smooth. Moreover, due to the lateral clearances provided for the valve member, it will remain vertical and hold a tight seal in spite of slight relative lateral displacements of the pressure plate 30.

It has been known heretofore to provide a relief valve housing with projecting lugs cooperating with the bottom pressure plate to limit the action of the diaphragm spring. These lugs complicate the casting and have to be machined on top to provide for suitable seating. In accordance with the present invention, the limiting function is performed by two elements, namely, rings 25 and 48 which have to be machined anyway, and consequently the new arrangement presents an important simplification. Furthermore, with the metal-to-metal contact of the valve and seat, it makes no difference whether or not the valve can rotate, and consequently no rotation preventing means are necessary as in the case of metal-to-gasket contact.

Threaded in bore 21 is a hollow fitting 51 which has a reduced cylindrical portion received in opening 23, the shoulder at the top of the threaded portion of the fitting compressing a gasket 52 against the shoulder 22. The fitting has sealed thereto the lower end of a bellows or "Sylphon" 53 whose upper end is closed by a plug 54 which is sealed thereto. Projecting upwardly from the plug is a threaded stud 55 on which is threaded a sleeve 56 whose upper end is spaced somewhat from the head of the seated valve member, as particularly shown in Figure 5. The transmitting abutment 55, 56 has a length determined by the extent the sleeve is threaded on the stud. This length is set at the factory and the parts are then rigidly united as by solder 57. Consequently, when fitting 51 is threaded in bore 21 to suitably compress the gasket, the exact proper clearance exists between sleeve 56 and the valve head 44. Fixed to the bottom of fitting 21 is one end of a tube 58 which communicates with the bellows through the fitting. The tube extends rectilinearly through and centrally of the inlet port and its other end 59 is sealed, as by crimping, after the tube and the bellows have been filled with a suitable heat expandible fluid, the tube being subjected, when the valve is mounted, to the heat of the fluid to be controlled.

It will be evident that when the bellows is expanded by excessive heat, it will engage and unseat the valve member 43 at a time predetermined by the setting of the transmitting abutment, thus permitting relief through passages 50 to the outlet chamber without disturbing the diaphragm. Being in the outlet chamber, the bellows is normally not subjected to contact with the heated fluid, but once the valve member lifts, the heated fluid contacts the bellows with an accelerated expanding effect thereupon so that the valve member is quickly lifted for full escape. On the other hand, when the valve member is lifted due to excessive pressure on the diaphragm, the temperature responsive unit is not positionally disturbed.

The disclosure herein typifies structure in accordance with the invention and it is to be understood that the variations in the disclosed form arrangement of parts are contemplated under the invention as hereinafter defined.

I claim:

1. A relief valve comprising a housing having an inlet port and an outlet port, partition means dividing the housing interior into an inlet chamber and an outlet chamber, an opening in the partition means having a surrounding margin on the inlet side of the partition means providing a valve seat, a movable valve member normally engaging said seat, another opening in said partition means aligned with the first and with said inlet port, said other opening being threaded, a fitting of a size to be introduced through said inlet port threaded in said other opening, means limiting the threading-in of said fitting, a bellows of a size to be passed through said inlet port and said outer opening secured at one end to said fitting and projecting within said outlet chamber toward said valve member, an abutment projecting from the other end of said bellows and adapted to engage and unseat said valve member upon expansion of said bellows, said abutment comprising two parts adjusted to provide a certain length and locked together, and a tube communicating at one end with said bellows through said fitting and projecting through the inlet port, the other end of the tube being closed and the tube and bellows being filled with an expansible fluid.

2. A relief valve comprising a housing having an inlet port and an outlet port, partition means dividing the housing interior into an inlet chamber and an outlet chamber, an opening in the partion means having a surrounding margin on the inlet side of the partition means providing a valve seat, a movable valve member normally engaging said seat, another opening in said partition means aligned with the first and with said inlet port, said other opening being threaded, a fitting of a size to be introduced through said inlet port threaded in said other opening, means limiting the threading-in of said fitting, a bellows of a size to be passed through said inlet port and said outer opening secured at one end to said fitting and projecting within said outlet chamber toward said valve member, an abutment projecting from the other end of said bellows and adapted to engage and unseat said valve member upon expansion of said bellows, said abutment comprising a threaded stem and a sleeve threaded thereon to provide a certain length and united by solder, and a tube communicating at one end with said bellows through said fitting and projecting through the inlet port, the other end of the tube being closed and the tube and bellows being filled with an expansible fluid.

3. A valve comprising a housing having a flow passage therethrough including an opening having an edge on the inlet side providing a valve seat, means opposed to said seat and movable toward and away from said seat, a bore in said movable means faced toward said seat, a movable valve member including a stem portion and a head portion, said stem portion being loosely guided in said bore, and a lost-motion connection between said valve member and movable means, said head having a convex surface including spaced apart annular zones developed on one radius and an intermediate zone developed on a longer radius and smoothly merging with said spaced apart zones, said intermediate zone being positioned for cooperation with said seat.

LORIN E. GROSBOLL.

REFERENCES CITED

The following references are of record in the file of this patent:

UNITED STATES PATENTS

| Number | Name | Date |
|---|---|---|
| 1,008,816 | Hamilton | Nov. 14, 1911 |
| 1,356,732 | Murphy | Oct. 26, 1920 |
| 1,927,036 | Johnson | Sept. 19, 1933 |
| 1,935,978 | Harrison | Nov. 21, 1933 |
| 1,949,559 | Campbell | Mar. 6, 1934 |
| 2,035,512 | Smith | Mar. 31, 1936 |
| 2,074,292 | Wilkins | Mar. 16, 1937 |
| 2,223,115 | McDormott | Nov. 26, 1940 |
| 2,242,358 | Lessmann | May 20, 1941 |
| 2,311,110 | Johnson | Feb. 16, 1943 |
| 2,351,190 | Carlson | June 13, 1944 |
| 2,400,615 | Warrick et al. | May 21, 1946 |

FOREIGN PATENTS

| Number | Country | Date |
|---|---|---|
| 38,935 | Netherlands | Sept. 15, 1936 |
| 459,917 | Great Britain | Jan. 18, 1937 |